US011124177B2

(12) United States Patent
Laberge et al.

(10) Patent No.: US 11,124,177 B2
(45) Date of Patent: Sep. 21, 2021

(54) ELECTRONIC STABILITY SYSTEM FOR A VEHICLE HAVING A STRADDLE SEAT

(71) Applicant: BOMBARDIER RECREATIONAL PRODUCTS INC., Valcourt (CA)

(72) Inventors: Nicolas Laberge, Valcourt (CA); Sebastien Lavoie, Valcourt (CA); Bruno Cyr, Shefford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 212 days.

(21) Appl. No.: 16/481,002

(22) PCT Filed: Jan. 30, 2018

(86) PCT No.: PCT/IB2018/050577
§ 371 (c)(1),
(2) Date: Jul. 25, 2019

(87) PCT Pub. No.: WO2018/142286
PCT Pub. Date: Aug. 9, 2018

(65) Prior Publication Data
US 2020/0001861 A1    Jan. 2, 2020

Related U.S. Application Data

(60) Provisional application No. 62/452,670, filed on Jan. 31, 2017.

(51) Int. Cl.
*B60W 30/02* (2012.01)
*B60W 50/00* (2006.01)
(Continued)

(52) U.S. Cl.
CPC ............ *B60W 30/02* (2013.01); *B60W 50/00* (2013.01); *B62J 25/00* (2013.01); *B62J 27/00* (2013.01);
(Continued)

(58) Field of Classification Search
CPC .............. B60W 30/02; B60W 50/00; B60W 2050/0088; B60W 2300/367;
(Continued)

(56) References Cited

U.S. PATENT DOCUMENTS 6,426,619 B1    7/2002  Pfaffenberger et al.
7,404,568 B1    7/2008  Portelance et al.
(Continued)

FOREIGN PATENT DOCUMENTS

CN      1706710 A      12/2005
CN    101391627 A       3/2009
(Continued)

OTHER PUBLICATIONS

Supplementary European Search Report of Corresponding European Application No. 18748176.7; The Hague; Search completed on Jul. 15, 2020.
(Continued)

*Primary Examiner* — Sze-Hon Kong
(74) *Attorney, Agent, or Firm* — BCF LLP

(57) ABSTRACT

A vehicle has a frame, at least two wheels, a motor, a straddle seat defining a driver seat portion and a passenger seat portion at least partially rearward of the driver seat portion, left and right passenger footrests connected to the frame, the left and right passenger footrests each being movable between a stowed position and a deployed position, a passenger footrest position sensor for sensing a position of at least one of the left and right passenger footrests, and an electronic stability system electronically connected to the passenger footrest position sensor for receiving a signal from the passenger footrest position sensor indicative of the position of the at least one of the left and right passenger (Continued)

footrests. An output of the electronic stability system is defined at least in part on the signal from the passenger footrest position sensor.

20 Claims, 8 Drawing Sheets

(51) Int. Cl.
*B62J 25/00* (2020.01)
*B62J 27/00* (2020.01)
*B62J 99/00* (2020.01)
*B62K 5/027* (2013.01)
*B62K 5/05* (2013.01)
*B62K 5/08* (2006.01)
*B62J 45/00* (2020.01)
*B62J 45/20* (2020.01)
*B62J 45/40* (2020.01)

(52) U.S. Cl.
CPC ...... *B62J 99/00* (2013.01); *B60W 2050/0088* (2013.01); *B60W 2300/367* (2013.01); *B60W 2510/30* (2013.01); *B60W 2520/105* (2013.01); *B60W 2520/125* (2013.01); *B60W 2520/14* (2013.01); *B60W 2520/18* (2013.01); *B60W 2520/28* (2013.01); *B60W 2540/18* (2013.01); *B60W 2710/18* (2013.01); *B62J 45/00* (2020.02); *B62J 45/20* (2020.02); *B62J 45/40* (2020.02); *B62K 5/027* (2013.01); *B62K 5/05* (2013.01); *B62K 5/08* (2013.01)

(58) Field of Classification Search
CPC ....... B60W 2510/30; B60W 2520/105; B60W 2520/125; B60W 2520/14; B60W 2520/18; B60W 2540/18; B60W 2710/18; B60W 2300/36; B60W 2040/0881; B60W 2050/0095; B62J 25/00; B62J 27/00; B62J 99/00; B62J 45/00; B62J 45/20; B62J 45/40; B62J 25/04; B62K 5/027; B62K 5/05; B62K 5/08
See application file for complete search history.

(56) References Cited

U.S. PATENT DOCUMENTS

| | | | |
|---|---|---|---|
| 7,431,118 B1 | 10/2008 | Hogg | |
| 7,823,900 B2 | 11/2010 | Warren | |
| 7,992,885 B2 | 8/2011 | Ishikawa et al. | |
| 8,181,982 B1 | 5/2012 | Ward | |
| 8,870,207 B2 | 10/2014 | Parvey | |
| 9,278,722 B2 | 3/2016 | Yokoyama et al. | |
| 9,352,795 B2 | 5/2016 | Parvey | |
| 2004/0035625 A1* | 2/2004 | Talbot | F16H 61/66272 180/210 |
| 2006/0180372 A1 | 8/2006 | Mercier et al. | |
| 2007/0062327 A1* | 3/2007 | Kouchi | B62J 25/00 74/564 |
| 2008/0111345 A1* | 5/2008 | Springer | B62J 25/00 280/291 |
| 2008/0238032 A1* | 10/2008 | Ishikawa | B62J 25/00 280/291 |
| 2008/0252035 A1* | 10/2008 | Day | B62J 25/00 280/220 |
| 2009/0084623 A1 | 4/2009 | Dagenais | |
| 2010/0178815 A1 | 7/2010 | Leblanc | |
| 2011/0062690 A1 | 3/2011 | Kizaki | |
| 2014/0131131 A1 | 5/2014 | Marois et al. | |
| 2015/0191946 A1* | 7/2015 | Nishida | B62J 9/26 292/200 |
| 2015/0203042 A1* | 7/2015 | Honkanen | B60R 3/02 280/166 |
| 2015/0266532 A1* | 9/2015 | Horiuchi | B62K 19/46 296/78.1 |
| 2016/0023706 A1 | 1/2016 | Chang et al. | |
| 2016/0090137 A1 | 3/2016 | Mori et al. | |
| 2016/0090139 A1* | 3/2016 | Mori | G05D 3/00 280/291 |

FOREIGN PATENT DOCUMENTS

| | | |
|---|---|---|
| CN | 101918256 A | 12/2010 |
| CN | 102348580 A | 2/2012 |
| CN | 103635381 A | 3/2014 |

OTHER PUBLICATIONS

English Translation of Search Report for corresponding Chinese application No. 201880015097.X, dated Jun. 24, 2021.

* cited by examiner

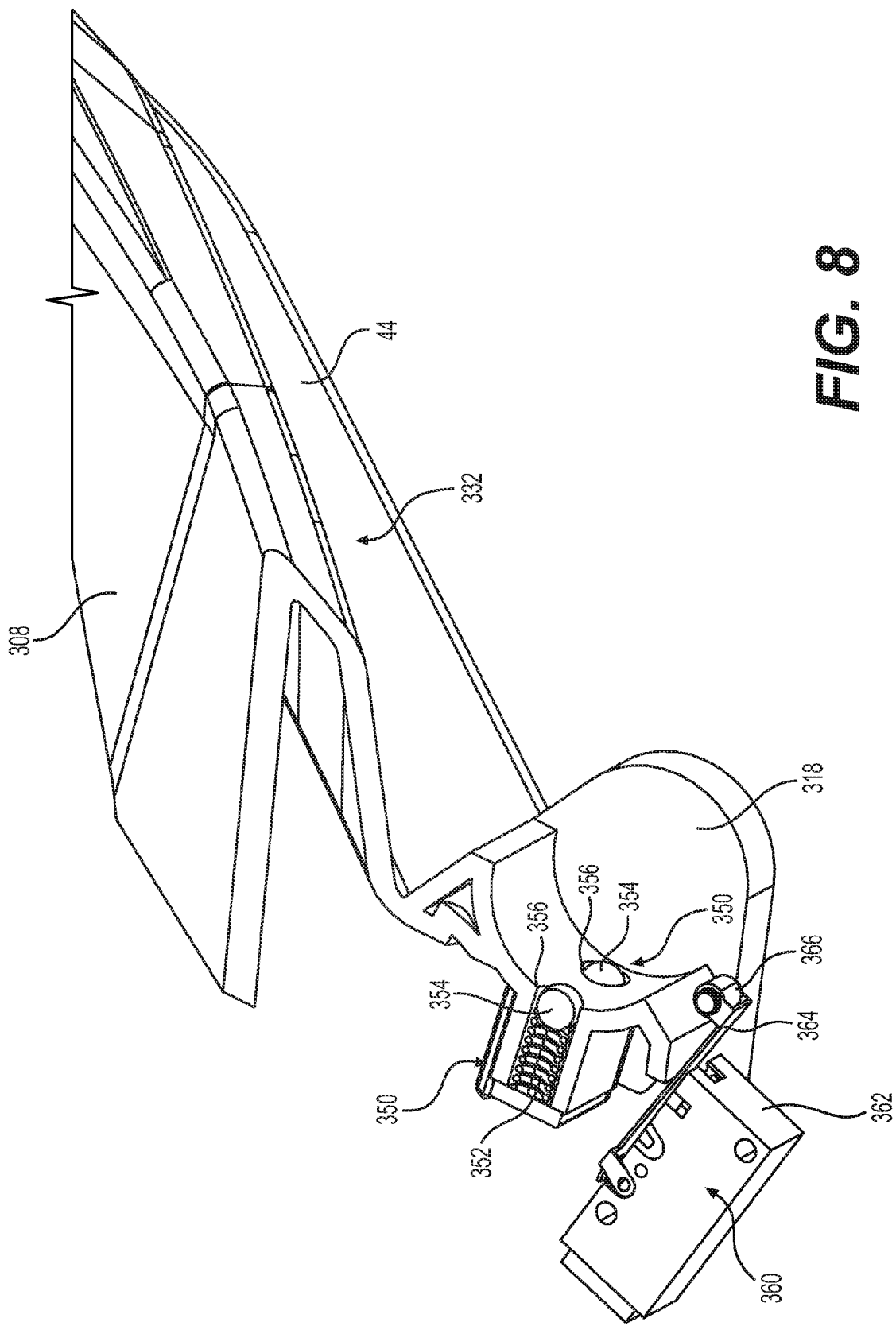

ELECTRONIC STABILITY SYSTEM FOR A VEHICLE HAVING A STRADDLE SEAT

CROSS-REFERENCE

The present application claims priority to U.S. Provisional Patent Application No. 62/452,670, filed Jan. 31, 2017, the entirety of which is incorporated herein by reference.

FIELD OF TECHNOLOGY

The present technology relates to an electronic stability system based at least in part on a position of a passenger footrest of a vehicle having a straddle seat and a vehicle having a straddle seat and such an electronic stability system.

BACKGROUND

Vehicles with straddle seats are convenient for their small sizes that make them easy to maneuver in limited space. This includes, for example, parking in urban settings for road vehicles and maneuvering off-road, such as in a forest, for off-road vehicles. They also require less energy to move given their reduced mass.

These vehicles include, but are not limited to, two wheel motorcycles, three wheel motorcycles, and four wheel all-terrain vehicles (ATVs). In the case of a three wheel motorcycles, two different configurations are generally known. The first configuration has two wheels at the front and one wheel at the back. The second configuration has one wheel at the front and two wheels at the back.

The height of the center of gravity (CG) of a vehicle with its rider(s) has a significant influence on the dynamic stability of the vehicle. The vertical position of the CG is measured as a distance from level ground when the vehicle is at rest. For a vehicle having a straddle seat, the elevated position of the seat generally results in a high CG. This factor particularly affects the stability of a light mass vehicle using a straddle seat. The position of the CG also changes according to the driving position of the driver on the straddle seat. The presence of a passenger also has a significant effect given that the additional mass of the passenger accounts for a significant portion of the mass of the loaded vehicle.

Vehicles having a recumbent seat generally have a lower CG when loaded but they require additional space. Recumbent seats include bucket seats of the type usually found in automobiles While straddle seats may have a higher CG, they offer certain advantages that are not available with recumbent seat vehicles. In particular, straddle seats allow the driver to adopt a more compact riding position, allow for a better vision since the driver is disposed higher, and permit the rider to lean into a turn.

An advantage of a vehicle having a tandem straddle type seat, which can accommodate a driver and a passenger behind the driver is that the CG of the vehicle remains laterally symmetrically positioned when the vehicle is upright regardless of whether a passenger is present or not. In contrast, on a light mass recumbent seat vehicle having side-by-side seats, when only the driver is present, the center of gravity is not laterally located in the same position as when there are two riders in the vehicle. When only a driver is present onboard a vehicle with side-by-side recumbent seats, the center of gravity may be offset from the longitudinal centerline of the vehicle in a direction toward the driver. The addition of a passenger may similarly offset the center of gravity in a direction toward the passenger.

When operating any vehicle, stability is a concern during turning. When negotiating a curve, a vehicle is subject to centrifugal forces, as is readily understood by those of ordinary skill in the art of vehicle design. Generally, a higher CG causes the vehicle to have a lower rollover threshold than a vehicle with a lower CG due to centrifugal forces.

Electronic stability systems (ESS) have been developed to improve the stability of vehicles. ESS is also referred to as vehicle stability system (VSS), and electronic stability program ESP. ESSs are designed to electronically manage different systems on a vehicle to influence and control the vehicle's behaviour. An ESS can manage a considerable number of parameters at the same time. This provides an advantage over a vehicle having no such system. A typical ESS takes several inputs from the vehicle and applies different corrective measures back to the vehicle to influence the vehicle's behaviour. Examples of inputs include steering column rotation, longitudinal and transverse acceleration of the vehicle, pitch, roll and yaw of the vehicle, engine output, brake and accelerator displacement, rotational speed of the wheels, and brake pressure in the braking system amongst others.

The outputs from the ESS can affect the vehicle's behaviour generally by independently managing the brakes on each wheel, the suspension, and the power output of the engine in order to improve the vehicle's handling under certain circumstances.

However, since the presence of a passenger has a significant impact on its handling characteristics, as previously mentioned, it is desirable for the ESS to account for the presence of a passenger on the vehicle.

Accordingly, some ESS receive a signal from a passenger presence sensor located in or under the passenger seat portion. Depending on the presence or absence of a passenger, the ESS operates differently. Examples of vehicles having an ESS and passenger presence sensor are provided in U.S. Pat. No. 8,260,535, issued Sep. 4, 2012, U.S. Pat. No. 8,577,588, issued Nov. 5, 2013, and U.S. Pat. No. 9,020,744, issued Apr. 28, 2015, the entirety of all of which is incorporated herein by reference. International Patent Publication No. WO/2016/046775, published Mar. 31, 2016 describes an example of a passenger presence sensor and an associated passenger seat portion.

Although locating a passenger presence sensor in or under the passenger seat portion allows for the proper determination of the presence of a passenger, it disadvantageously requires substantial modification of the passenger seat portions and/or the adjacent portion of the vehicle frame to accommodate the sensor and its associated component.

Therefore, there is a desire for a vehicle having an ESS that modifies the way in which it controls the vehicle based on the presence or absence of a passenger but which does not use a passenger presence sensor located in or under the passenger seat portion.

SUMMARY

It is an object of the present technology to ameliorate at least some of the inconveniences present in the prior art.

According to an aspect of the present technology, there is provided a vehicle having a frame, at least two wheels attached to the frame, a motor operatively connected to at least one of the wheels, a straddle seat supported by the frame, the straddle seat defining a driver seat portion and a passenger seat portion at least partially rearward of the driver seat portion, left and right passenger footrests connected to the frame, the left and right passenger footrests each being movable between a stowed position and a deployed position, a passenger footrest position sensor for sensing a position of at least one of the left and right passenger footrests, and an electronic stability system electronically connected to the passenger footrest position sensor for receiving a signal from the passenger footrest position sensor indicative of the position of the at least one of the left and right passenger footrests. An output of the electronic stability system is defined at least in part on the signal from the passenger footrest position sensor.

According to some implementations of the present technology, the output of the electronic stability system is based at least in part on a calibration. The calibration is a first calibration when the signal from the passenger footrest position sensor is indicative of the position of the at least one of the left and right passenger footrests being the stowed position. The calibration is a second calibration when the signal from the passenger footrest position sensor is indicative of the position of the at least one of the left and right passenger footrests being the deployed position.

According to some implementations of the present technology, the motor is controlled at least in part based on the output of the electronic stability system.

According to some implementations of the present technology, a braking system including at least one brake assembly is operatively connected to at least one of the at least two wheels. The braking system is controlled at least in part based on the output of the electronic stability system.

According to some implementations of the present technology, the vehicle also has at least one vehicle operating condition sensor for sensing at least one vehicle operating condition. The electronic stability system is electronically connected to the at least one vehicle operating condition sensor for receiving a signal from the at least one vehicle operating condition sensor indicative of the at least one sensed vehicle operating condition. The output of the electronic stability system is defined at least in part on the signal from the at least one vehicle operating condition sensor.

According to some implementations of the present technology, the at least one vehicle operating condition sensor is at least one of: a wheel speed sensor for sensing a speed of one of the at least two wheels; a steering angle sensor for sensing an angular position of a steering assembly, the steering assembly being operatively connected to at least one of the at least two wheels; a lateral accelerometer for sensing a lateral acceleration of the vehicle; a longitudinal accelerometer for sensing a longitudinal acceleration of the vehicle; a yaw rate sensor for sensing a yaw rate of the vehicle; and a roll sensor for sensing a roll of the vehicle.

According to some implementations of the present technology, the at least two wheels is two front wheels and one rear wheel and the motor is operatively connected to the rear wheel.

According to some implementations of the present technology, a passenger support structure is connected to the frame. The passenger seat portion is supported by the passenger support structure. The left and right passenger footrests are connected to the passenger support structure.

According to some implementations of the present technology, the passenger footrest position sensor is received at least partially in the passenger support structure.

According to some implementations of the present technology, the left passenger footrest extends from a left leg. The left leg moves with the left passenger footrest between the stowed position and the deployed position. The left leg extends at least partially along the passenger support structure when the left passenger footrest is in the stowed position. The right passenger footrest extends from a right leg. The right leg moves with the right passenger footrest between the stowed position and the deployed position. The right leg extends at least partially along the passenger support structure when the right passenger footrest is in the stowed position.

According to some implementations of the present technology, left and right driver footrests are connected to the frame forward of the left and right passenger footrests.

According to some implementations of the present technology, the left and right passenger footrests are each pivotable between the stowed position and the deployed position.

According to some implementations of the present technology, the left footrest pivots about a left pivot axis between the stowed position and the deployed position. The left pivot axis extends upward and leftward as the left pivot axis extends forward. The right footrest pivots about a right pivot axis between the stowed position and the deployed position. The right pivot axis extends upward and rightward as the right pivot axis extends forward.

According to another aspect of the present technology, there is provided an electronic stability system assembly for a vehicle having a passenger footrest adapted for connecting to a frame and for being movable between a stowed position and a deployed position, a passenger footrest position sensor for sensing a position of the passenger footrest, and an electronic stability system electronically connected to the passenger footrest position sensor for receiving a signal from the passenger footrest position sensor indicative of the position of the passenger footrest. An output of the electronic stability system is defined at least in part on the signal from the passenger footrest position sensor.

According to some implementations of the present technology, the output of the electronic stability system is based at least in part on a calibration. The calibration is a first calibration when the signal from the passenger footrest position sensor is indicative of the position of the passenger footrest being the stowed position. The calibration is a second calibration when the signal from the passenger footrest position sensor is indicative of the position of the passenger footrest being the deployed position.

According to some implementations of the present technology, the output of the electronic stability system is adapted for controlling at least in part a motor of the vehicle.

According to some implementations of the present technology, the output of the electronic stability system is adapted for controlling at least in part a braking system of the vehicle.

According to some implementations of the present technology, the electronic stability system assembly has at least one vehicle operating condition sensor for sensing at least one vehicle operating condition. The electronic stability system is electronically connected to the at least one vehicle operating condition sensor for receiving a signal from the at least one vehicle operating condition sensor indicative of the at least one sensed vehicle operating condition. The output of the electronic stability system is defined at least in part on the signal from the at least one vehicle operating condition sensor.

According to some implementations of the present technology, the at least one vehicle operating condition sensor is at least one of: a wheel speed sensor for sensing a speed of a wheel of the vehicle; a steering angle sensor for sensing an angular position of a steering assembly of the vehicle; a lateral accelerometer for sensing a lateral acceleration of the vehicle; a longitudinal accelerometer for sensing a longitudinal acceleration of the vehicle; a yaw rate sensor for sensing a yaw rate of the vehicle; and a roll sensor for sensing a roll of the vehicle.

According to some implementations of the present technology, a passenger support structure is adapted for connecting to the frame of the vehicle. The passenger footrest is connected to the passenger support structure.

According to some implementations of the present technology, the passenger footrest position sensor is received at least partially in the passenger support structure.

According to some implementations of the present technology, the passenger footrest extends from a leg. The leg moves with the passenger footrest between the stowed position and the deployed position. The leg extends at least partially along the passenger support structure when the passenger footrest is in the stowed position.

According to some implementations of the present technology, the passenger footrest is adapted for pivoting between the stowed position and the deployed position.

According to another aspect of the present technology, there is provided a method for controlling a vehicle. The vehicle has a frame, at least two wheels attached to the frame, a straddle seat supported by the frame, the straddle seat defining a driver seat portion and a passenger seat portion adjacent to the driver seat portion, and left and right passenger footrests connected to the frame. The left and right passenger footrests are each movable between a stowed position and a deployed position. The method comprises: sensing a position of at least one of the left and right passenger footrests; defining an output of an electronic stability system of the vehicle based at least in part on the sensed position of the at least one of the left and right passenger footrests; and controlling a stability of the vehicle using the output of the electronic stability system.

According to some implementations of the present technology, the method further comprises: selecting a first calibration of the electronic stability system when the sensed position of the at least one of the left and right passenger footrests is the stowed position; and selecting a second calibration of the electronic stability system when the sensed position of the at least one of the left and right passenger footrests is the deployed position. The output of the electronic stability system is defined based at least in part on a selected one of the first and second calibration positions.

According to some implementations of the present technology, controlling the stability of the vehicle using the output of the electronic stability system comprises controlling an operation of a motor of the vehicle.

According to some implementations of the present technology, controlling the stability of the vehicle using the output of the electronic stability system comprises controlling an operation of a braking system of the vehicle.

According to some implementations of the present technology, the method further comprises sensing at least one vehicle operating condition. The at least one vehicle operating condition is at least one of a wheel speed, a steering angle, a lateral acceleration, a longitudinal acceleration, a yaw rate, and a roll. The output of the electronic stability system of the vehicle is defined based at least in part on the at least one sensed vehicle operating condition.

For purposes of the application, terms related to spatial orientation, such as "left", "right", "front", "rear", "up", and "down", are defined according to the normal, forward travel direction of a vehicle. As a result, the "left" side of a vehicle corresponds to the left side of a rider seated in a forward-facing position on the vehicle.

Implementations of the present technology each have at least one of the above-mentioned objects and/or aspects, but do not necessarily have all of them. It should be understood that some aspects of the present technology that have resulted from attempting to attain the above-mentioned objects may not satisfy these objects and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 8 is a close-up partial cross-section of a the passenger support structure of FIG. 7 taken vertically lower than in FIG. 7 with the passenger footrest position sensor of FIG. 7.

DETAILED DESCRIPTION

Reference will now be made to present implementations of the technology, one or more examples of which are illustrated in the accompanying drawings. Each example is provided by way of explanation of the technology, not limitation of the technology. It will be apparent to those skilled in the art that modifications and variations can be made to the described implementations without departing from the scope or spirit of the technology. For instance, features illustrated or described as part of one implementation may be used on another implementation to yield a further implementation.

The present technology will be explained with reference to a three wheel vehicle 10 having a straddle seat 12. It is contemplated that aspects of the present technology could be used on other wheeled vehicles having a straddle seat, such as, but not limited to all-terrain vehicles (ATVs) and motorcycles.

Figure 1:
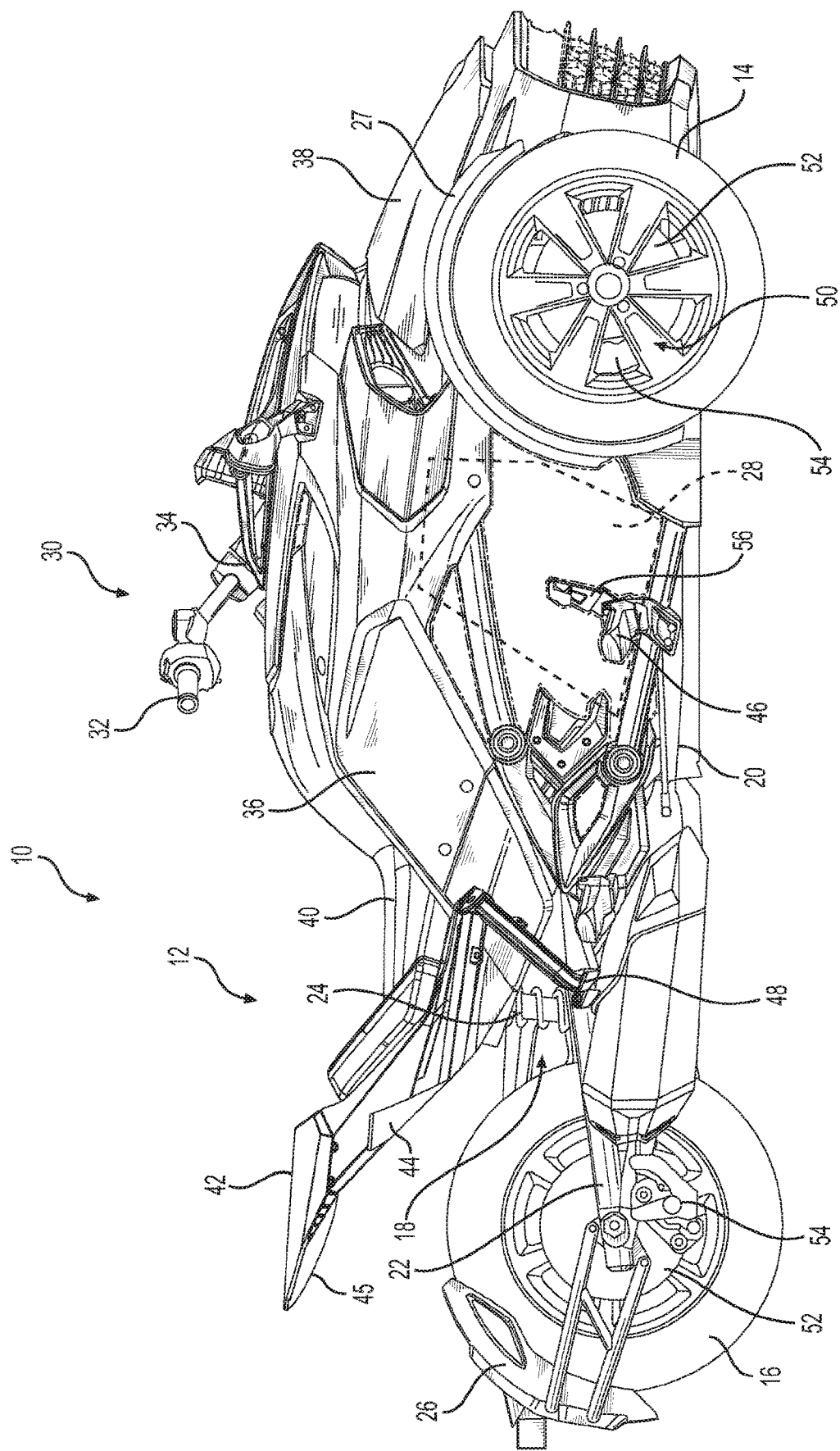
FIG. 1 is a right side elevation view of a three wheel vehicle.

The three wheel vehicle 10 is illustrated in FIG. 1. The vehicle 10 has steerable left and right front wheels 14 (only the right one being shown) and a single rear wheel 16. The front wheels 14 are equally offset from a central longitudinal axis and the rear wheel 16 is centered relative to the central longitudinal axis. The left and right front wheels 14 and the rear wheel 16 each have a tire.

Each front wheel 14 is supported by a front suspension assembly (not shown). The rear wheel 16 is supported by a rear suspension assembly 18. The front suspension assemblies and the rear suspension assembly 18 are secured to a frame 20 of the vehicle 10. Each front suspension assembly includes a pair of suspension support arms (A-arms) operatively connected between the frame 20 and its corresponding front wheel 14 and a shock absorber extending from the frame 20 to a lower one of the suspension support arms. The rear suspension assembly 18 includes a rear swing arm assembly 22 and a shock absorber 24. The rear swing arm assembly 22 is pivotally connected to the frame 20 at the front and the rear wheel 16 is rotationally connected to the rear of the rear swing arm assembly 22. The shock absorber 24 is connected to and extends between the rear swing arm assembly 22 and the frame 20. It is contemplated that the front suspension assemblies and the rear suspension assembly 18 could be of a type that differs from those described above.

A fender assembly 26 is disposed about of the rear wheel 16. The fender assembly 26 is connected to the rear swing arm assembly 22. The fender assembly 26 prevents dirt, water and road debris from being thrown up onto the rider, while the vehicle 10 is operating. It is contemplated that the fender assembly 26 could be omitted. The front wheels 14 are provided with fender assemblies 27.

A motor 28 (schematically shown in FIG. 1) is supported by the frame 20. The motor 28 is connected to the rear wheel 16 via a transmission system (not shown) to drive the rear wheel 16. In the present implementation, the motor 28 is a four-stroke, two-cylinder, V-type internal combustion engine. It is contemplated that the motor 28 could be another type of motor, such as a two-stroke, single-cylinder internal combustion engine or an electric motor for example.

The steering of the front wheels 14 is achieved through the use of a steering assembly 30. The steering assembly 30 includes a handlebar 32 connected to a steering column 34 that is operatively connected via steering linkages (not shown) to the front wheels 14. It is contemplated that the steering assembly could be provided with a power steering system.

The vehicle 10 has a number of body panels 36 and a hood 38. The hood 38 can be opened to provide access to a storage compartment. The body panels 36 and the hood 38 are connected to the frame 20.

As previously described, the vehicle 10 has a straddle seat 12. The straddle seat 12 is supported by the frame 20. The straddle seat 12 has a driver seat portion 40 and a passenger seat portion 42 designed to accommodate a driver and a passenger respectively. As can be seen, the passenger seat portion 42 is disposed rearward of the driver seat portion 40 and is higher than the driver seat portion 40. In the present implementation, the driver seat portion 40 and the passenger seat portion 42 are distinct from each other and can be installed onto and removed from the vehicle 10 separately. It is contemplated that the straddle seat 12 could be a unitary seat defining both portions 40, 42. As will be described in more detail below, the passenger seat portion 42 is supported by a passenger support structure 44 that is connected to the frame 20. Passenger hand grips 45 are provided on either sides of the passenger seat portion 42.

Left and right driver footrests 46 (only the right one being shown) are mounted to the frame 20 below and forward of the driver seat portion 40 in order to accommodate the feet of a driver of the vehicle 10 sitting on the driver seat portion 40. Left and right passenger footrests 48 are connected to the passenger support structure 44. As will be described in more detail below, the passenger footrests 48 are retractable and, as such, they can each be moved between a deployed position (shown in FIG. 1) and a retracted position (shown in dotted lines in FIG. 4). When the passenger footrests 48 are in their deployed positions, they are disposed below the passenger seat portion 42, rearward of the driver footrests 46, in order to accommodate the feet of a passenger of a vehicle 10 sitting on the passenger seat portion 42.

Each wheel 14, 16 is provided with a disk brake assembly 50, which together form part of a braking system of the vehicle 10. The braking system of the vehicle is a hydraulic braking system, but other types are contemplated. Each disk brake assembly 50 includes a disk 52 mounted to its respective wheel 14, 16 and a brake caliper 54. The brake calipers 54 are actuated in response to actuation of a brake pedal 56. It is contemplated that the brake calipers 54 could alternatively or additionally be activated by a hand actuated brake lever mounted to the handlebar 32.

The vehicle 10 is equipped with an electronic stability system (ESS) 140 (FIG. 2) which continuously monitors different vehicle parameters and applies corrective measures, i.e. wheel braking and/or engine torque management, whenever the vehicle operating conditions indicate that the vehicle 10 is approaching an unstable state. The ESS 140, mounted onboard vehicle 10, uses predetermined calibrations commonly disposed in a control map to determine which outputs (i.e. corrective measures) should be provided given specific inputs based on the vehicle operating conditions, one of which is the presence or absence of a passenger on the vehicle 10. The magnitude and the timing of the outputs are also managed by the ESS 140 in order to apply the appropriate corrective measures to the vehicle 10. In the present technology, the term calibration is used to describe a mathematical formula, a map, an algorithm or a value used to determine the outputs of the ESS based on the inputs.

The ESS 140 is dependent on inputs provided by sensors sensing the vehicle behaviour of the vehicle 10 to determine the outputs to be generated. A series of sensors can be used for sensing different operating conditions, as shown on FIG. 2. This list of sensors is provided for illustrative purposes and is not intended to limit the scope of this application to the listed sensors. Published U.S. patent application number US 2006/0180372A1, published Aug. 17, 2006, the entirety of which is incorporated herein by reference, provides more information about an ESS 140 and related sensors.

In the present implementations, there are three wheel speed sensors 100, 102, 104, one per wheel 14, 16, sense the speeds of rotation of the wheels 14, 16. A steering angle sensor 106 provides information to the ESS 140 about the angular position of the steering assembly 30 from which can also be determined the steering angle rate (e.g. the speed at which the steering is rotated). Lateral and longitudinal accelerometers 108, 110 are in communication with the ESS 140 and sense the lateral and longitudinal accelerations of the vehicle 10. These accelerometers 108, 110 can be combined with a yaw rate sensor 112 sensing the yaw rate of the vehicle 10 about a vertical axis in addition to longitudinal and lateral accelerations.

A brake pressure sensor 114 informs the ESS 140 of the instant amount of pressure in the braking system. Many brake pressure sensors 114 can be required to monitor different portions of the hydraulic braking system; i.e. the front and rear brake assemblies 50. A brake light switch 116 sends a signal to the ESS 140 when the brakes are activated, even lightly, regardless of the amount of pressure generated in the braking system. A brake fluid level sensor 118 is installed in each brake fluid reservoir on the vehicle 10 and provides information on the brake fluid level to the ESS 140. A brake travel sensor 120, adapted to sense the position of the brake pedal 56, indicates hard braking from the driver to the ESS 140. The brake travel sensor 120 is activated after the brake light switch 118 to determine, for example, strong intentional brake actuation or extreme brake lever movement due to a loss of brake fluid pressure in the braking system.

A passenger footrest position sensor 122 is installed as will be described in greater detail below to send signals to the ESS 140 regarding the position of the left passenger footrest 48. It is contemplated that the passenger footrest position sensor 122 could alternatively be positioned so as to sense a position of the right passenger footrests 48. It is also contemplated that two passenger footrest position sensors 122 could be provided to sense the position of both passenger footrests 48. The passenger footrest position sensor 122 will be discussed in greater detail below.

An engine RPM sensor 124 informs the ESS 140 of the rotational speed of the engine 28. A throttle position sensor 126 (TPS) determines a degree of opening of the throttle (not shown). A mass airflow sensor 128 indicates how much air is travelling through the throttle.

A roll sensor 130 installed on the vehicle 10 determines a roll angle of the vehicle 10. The roll angle sensed by the roll sensor 130 is compared to a pre-determined roll angle by the ESS 140 for current operating conditions of the vehicle 10.

These sensors can be used individually or collectively to bring inputs usable by the ESS 140 to analyze the operating conditions of the vehicle 10 such that appropriate outputs can be applied to the vehicle 10. It is contemplated that only some of the above sensors could be provided on the vehicle 10. It is also contemplated that other sensors could be provided on the vehicle 10 and be used by the ESS 140 as inputs.

Figure 2:
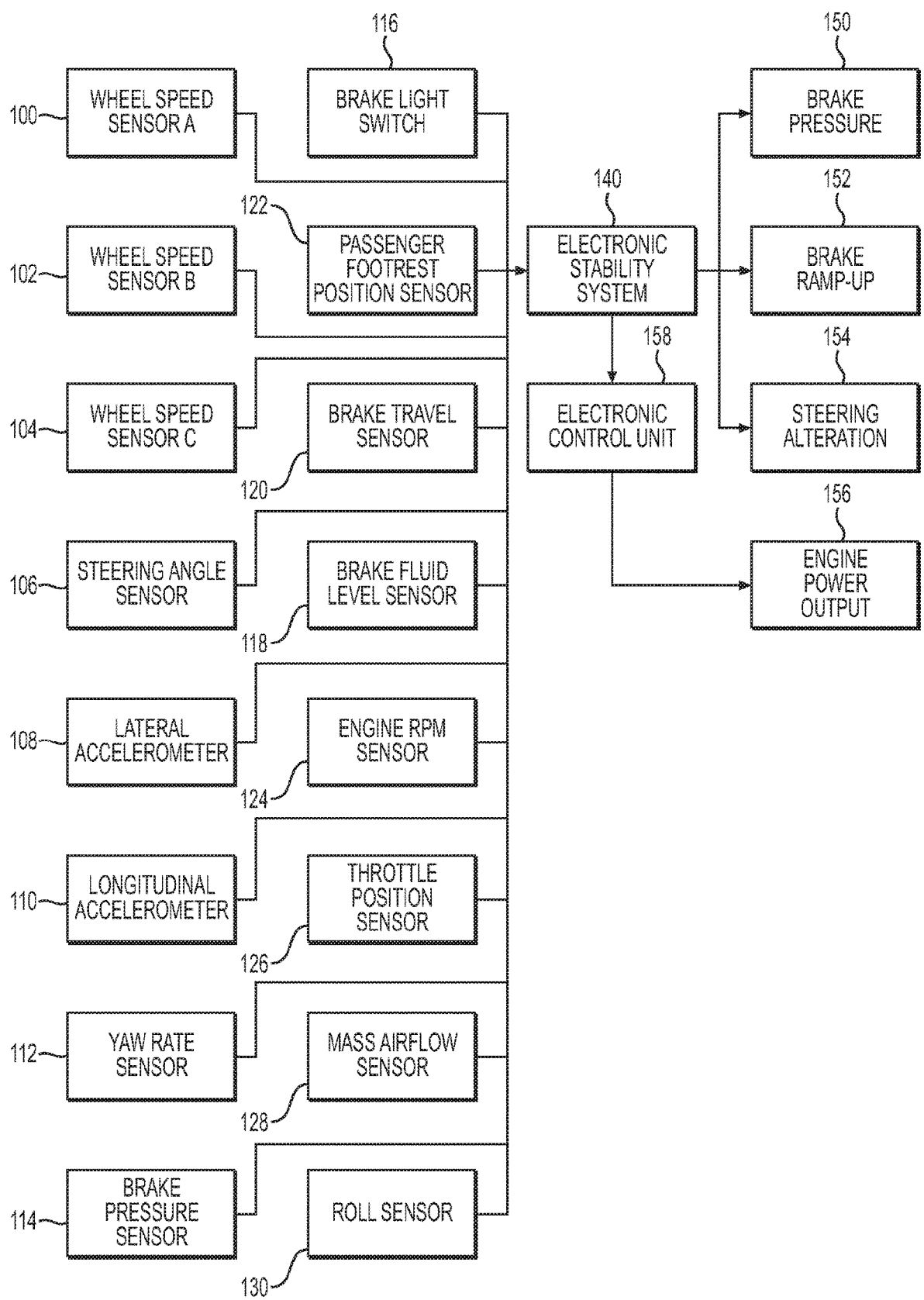
FIG. 2 is a schematic diagram depicting a plurality of sensors and a plurality of outputs associated with an electronic stability system of the vehicle of FIG. 1.

Various outputs might be provided by the ESS 140 to influence the behaviour of the vehicle 10. The ESS 140 can send outputs to increase the brake pressure 150 (FIG. 2) in the braking system, thus forcing braking of the vehicle 10 by overriding manual actuation of the brake pedal 56 by the driver. The ESS 140 can also increase or decrease the brake pressure ramp-up 152 (FIG. 2). The brake pressure ramp-up 152 is the speed at which the brake fluid pressure is raised to brake the vehicle 10 therefore providing a stronger and faster braking to the vehicle 10. Another output from the ESS 140 could be used to increase or decrease the stiffness 154 of the steering assembly 30 where the steering assembly is provided with a power steering system. The ESS 140 can also control the power output 156 of the engine 28. Change in the power output 156 of the engine 28 is normally done by the ESS 140 through the electronic control unit 158 (ECU) controlling the engine 28. The ECU 158 electronically modifies, individually or collectively, the ignition timing, the fuel injection timing and the amount of fuel injected in the combustion chamber. The ECU 158 can also modify the degree of opening of the throttle.

The ESS 140 uses predetermined calibrations stored on a computer readable media inside the ESS 140. It is contemplated that the calibration data can be updated by connecting the ESS 140 to a network through a computer to download updated data into the ESS 140. Alternatively, an input/output port (I/O port, not shown) of the ESS 140 can be used to download updated calibrations. Each calibration is used for determining outputs based on the inputs received from at least some of the plurality of sensors.

As previously described, in vehicles such as the vehicle 10, the presence of a passenger on the vehicle 10 makes a significant difference on the overall mass and therefore affects the control of the vehicle 10. As such, the ESS 140 affects the vehicle 10 differently depending on the presence or absence of a passenger. The ESS 140 according to the present technology uses signals from the passenger footrest position sensor 122 to determine if a calibration corresponding to the presence of a passenger on the passenger seat portion 42 should be used or if a calibration corresponding to the absence of a passenger on the passenger seat portion 42 should be used. If the passenger footrest position sensor 122 sends a signal indicative that the left passenger footrest 48 is deployed, the ESS 140 selects a calibration corresponding to the presence of a passenger. If the passenger footrest position sensor sends a signal indicative that the left passenger footrest 48 is stowed, the ESS 140 selects a calibration corresponding to the absence of a passenger. It will be appreciated that the left passenger footrest 48 may be deployed even though a passenger is not in fact present on the passenger seat portion 42, but the ESS 140 will nonetheless select the calibration corresponding to the presence of a passenger on the passenger seat portion 42.

Figure 3:
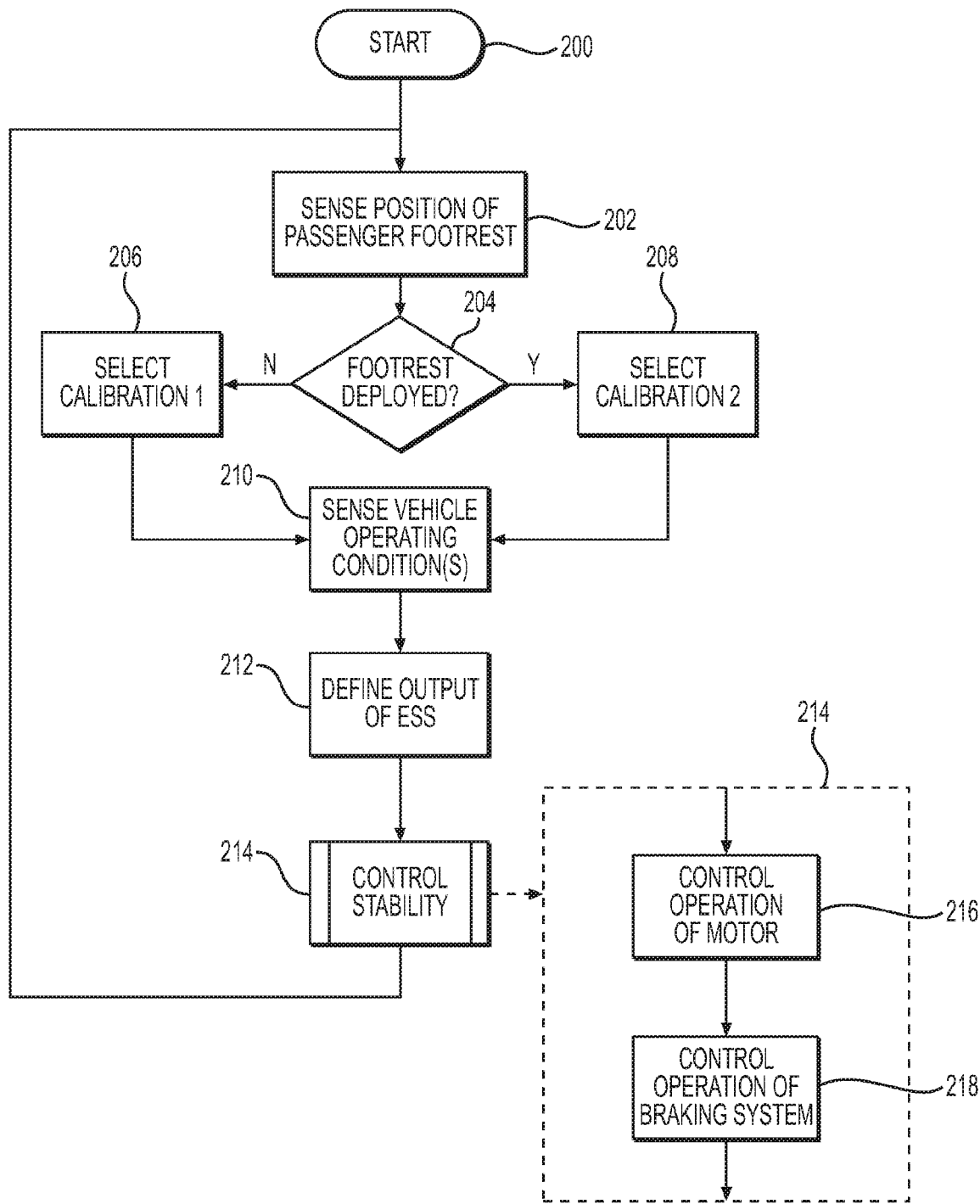
FIG. 3 is a logic diagram illustrating a method for controlling a vehicle.

With reference to FIG. 3, a method for controlling the vehicle 10 using the ESS 140 and the passenger footrest position sensor 122 will be described. As previously described, the passenger footrest position sensor 122 in the present implementation is disposed so as to sense a position of the left passenger footrest 48, and as such, the method will be described with reference to the left passenger footrest 48. It should be understood that method could be performed with the right passenger footrest 48 should it be provided with a passenger footrest position sensor 122. It is also contemplated that the method could be performed with both passenger footrests 48 should both be provided with passenger footrest position sensors 122.

The method begins at step 200 when the ESS 140 is turned on. It is contemplated that the method could begin at step 200 only once the ESS 140 is turned on and the engine 28 is running. Then at step 202 the passenger footrest position sensor 122 senses a position of the left passenger footrest 48 and sends signal representative of this position to the ESS 140. In the present implementation, the footrest position sensor 122 is a Hall effect sensor outputting a voltage that varies according to the position of the left passenger footrest 48. The footrest position sensor 122 sends a signal to the ESS 140, which in the present implementation is a voltage, that lets the ESS 140 determine if the left passenger footrest 48 is in the deployed position, the stowed position or any position intermediate the stowed and deployed positions. Should a passenger be present on the passenger seat portion 42 and with the left passenger footrest 48 not fully deployed, the weight applied by the passenger on the left passenger footrest 48 will cause the left passenger footrest to become fully deployed and the passenger footrest position sensor 122 will then send a signal representative of the left passenger footrest 48 being in the deployed position. In the present implementation, the passenger footrest position sensor 122 sends to the ESS 140 a first signal in the form of a first voltage when the left passenger footrest 48 is in the deployed position, a second signal in the form of a second voltage when the left passenger footrest 48 is in the stowed position. The first and second voltages are different from each other. It is contemplated that the passenger footrest position sensor 122 could send a third signal in the form of a third voltage when the left passenger footrest 48 is at a position intermediate the stowed and deployed positions. The third voltage differs from the first and second voltages. It is contemplated that any one of the first, second and third signals could be a null signal, which in the present implementation would correspond to a voltage of zero volt. It is also contemplated that the passenger footrest position sensor 122 could send signals to the ESS 140 representative of the exact or general position of the left passenger footrest 48 anywhere at or between the stowed and deployed positions.

From step 202, then at step 204 the ESS 140 determines if the left passenger footrest 48 is deployed based on the signal received from the passenger footrest position sensor 122 at step 202.

If at step 204 the ESS 140 determines that the left passenger footrest 48 is not in the deployed position, then the method continues to step 206 and selects a calibration, called for purposes of the present example "Calibration 1". The calibration "Calibration 1" corresponds to a calibration for the ESS 140 when no passenger is present on the passenger seat portion 42. If at step 204 the ESS 140 determines that the left passenger footrest 48 is in the deployed position, then the method continues to step 208 and selects a calibration, called for purposes of the present example "Calibration 2". The calibration "Calibration 2" corresponds to a calibration for the ESS 140 when a passenger is present on the passenger seat portion 42, which is presumed since the left passenger footrest 48 is deployed. "Calibration 1" of the ESS 140 is calibrated for an operating mass of the vehicle 10 corresponding to the mass of the vehicle 10 and a pre-determined mass of a driver located on the driver seat portion 40. "Calibration 2" of the ESS 140 is calibrated for an operating mass of the vehicle 10 corresponding to the mass of the vehicle 10, a pre-determined mass of a driver located on the driver seat portion 40 and a pre-determined mass of a passenger located on the passenger seat portion 42. In one example, the pre-determined masses and proportions of the driver and of the passenger both correspond to the mass of a $50^{th}$ percentile North American male, but other masses and proportions are contemplated. It is also contemplated that the pre-determined masses of the driver and of the passenger could differ from each other. In an implementation where both passenger footrests 48 are provided with passenger footrest position sensors 122, it is contemplated that "Calibration 1" would be selected (step 206) if one or both passenger footrests 48 are not deployed and that "Calibration 2" would be selected (step 208) only if both passenger footrests 48 are deployed. It is also contemplated that at step 202, the passenger footrest position sensor 122 could sense if the left passenger footrest 48 is in the stowed position or not and then from step 204 the method would proceed to step 206 if the left passenger footrest 48 is in the stowed position and to step 208 is the left passenger footrest 48 is not in the stowed position.

From either one of steps 206 and 208, the method continues at step 210. At step 210, one or more of the operating conditions of the vehicle is/are sensed by the corresponding on or more sensors 100, 102, 104, 106, 108, 110, 112, 114, 116, 118, 120, 124, 126, 128 and 130 discussed above with respect to FIG. 2, which send one or more corresponding signals to the ESS 140.

Then at step 212, based on the signal(s) received at step 210 and the calibration selected at step 206 or 208, the output of the ESS 140 is defined. The output of the ESS 140 determines what corrective actions, if any, need to be taken to help maintain stability of the vehicle 10.

Then at step 214, based on the output of the ESS 140 at step 212 the stability of the vehicle 10 is controlled. As shown in the dotted box to the right of step 214 in FIG. 3, in one implementation this means controlling the operation of the motor (step 216), such as by controlling then engine power output 156 (FIG. 2), and controlling the operation of the braking system (step 218), such as by controlling the brake pressure 150 and the brake ramp-up 152 (FIG. 2). It is contemplated that only one of steps 216 and 218 may be performed. It is also contemplated that other actions could be taken such as steering alteration 154 (FIG. 2). The control of the stability at step 214 overrides manual inputs by the driver.

From step 214 (or 218 in the specific example provided), the method returns to step 202 to ensure that the position of the left footrest 48 has not changed and the method is repeated.

It is contemplated that the calibrations selected at steps 206, 208 could instead be groups of calibrations, with the group of calibrations of alternative step 206 corresponding to calibrations where the left passenger footrest 48 is not deployed and the group of calibrations of alternative step 208 corresponding to calibrations where the left passenger footrest 48 is deployed. Then in a step intermediate steps 210 and 212, the ESS 140 selects a specific calibration from the selected group of calibrations 206 or 208 based on the one or more signals from step 210.

It is also contemplated that the calibrations of steps 206, 208 could be starting calibrations that would then be iterated by the ESS 140 based on actual accelerations and decelerations of the vehicle 10, for example, in order to obtain, over time, a calibration specifically adapted for the actual mass of the vehicle 10, the driver and, if applicable, the passenger. For example, the calibration of step 206 would be used as a light start mass calibration (i.e. vehicle 10 and driver only) and the calibration of step 208 would be used as a high start mass calibration (i.e. vehicle 10, driver and passenger) in an iterative calibration method similar to the one described in U.S. Pat. No. 9,020,744.

Figure 4:
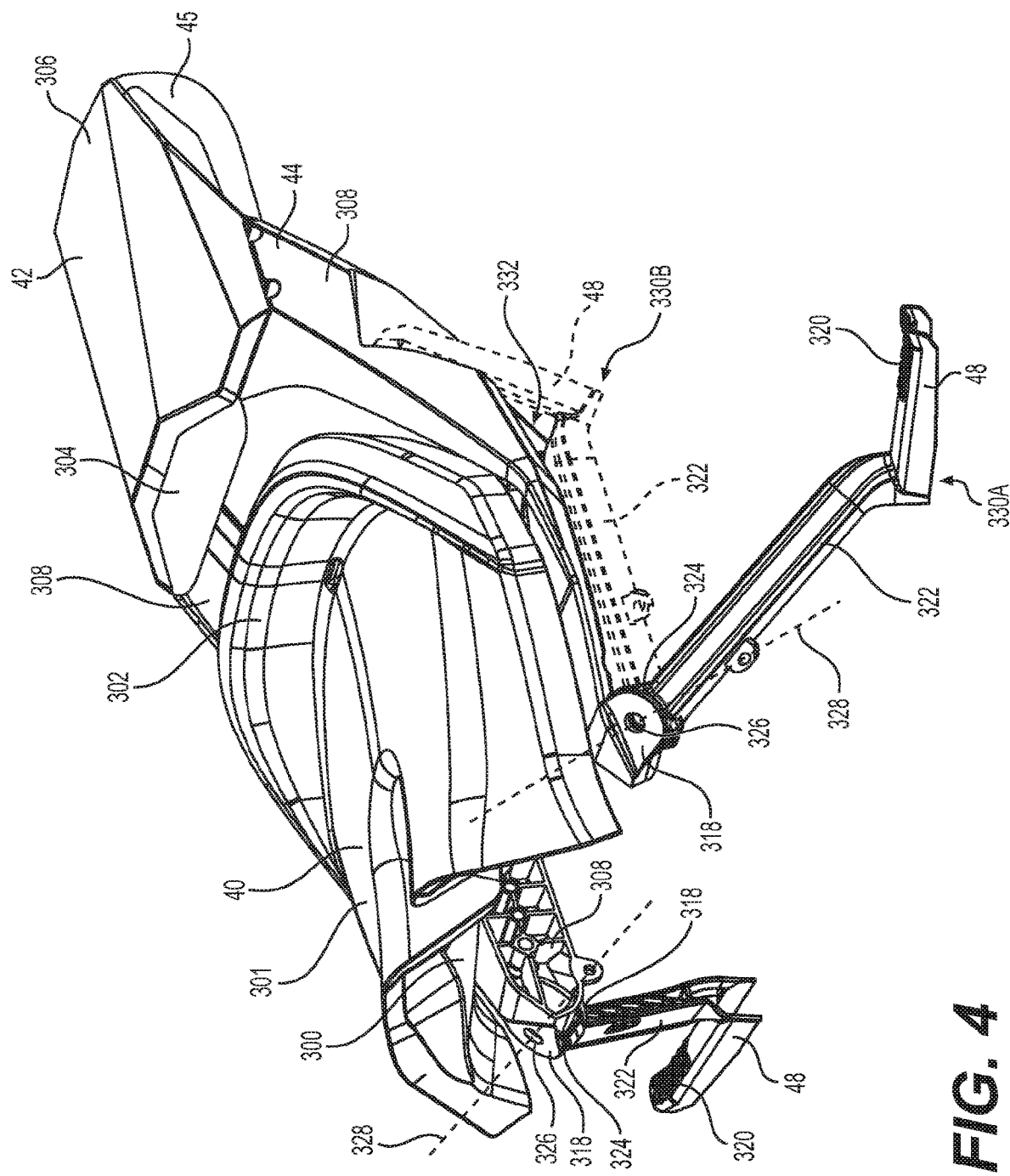
FIG. 4 is a perspective view taken from a front, left side of driver and passenger seat portions, a passenger support structure and passenger footrests of the vehicle of FIG. 1.
Figure 5:
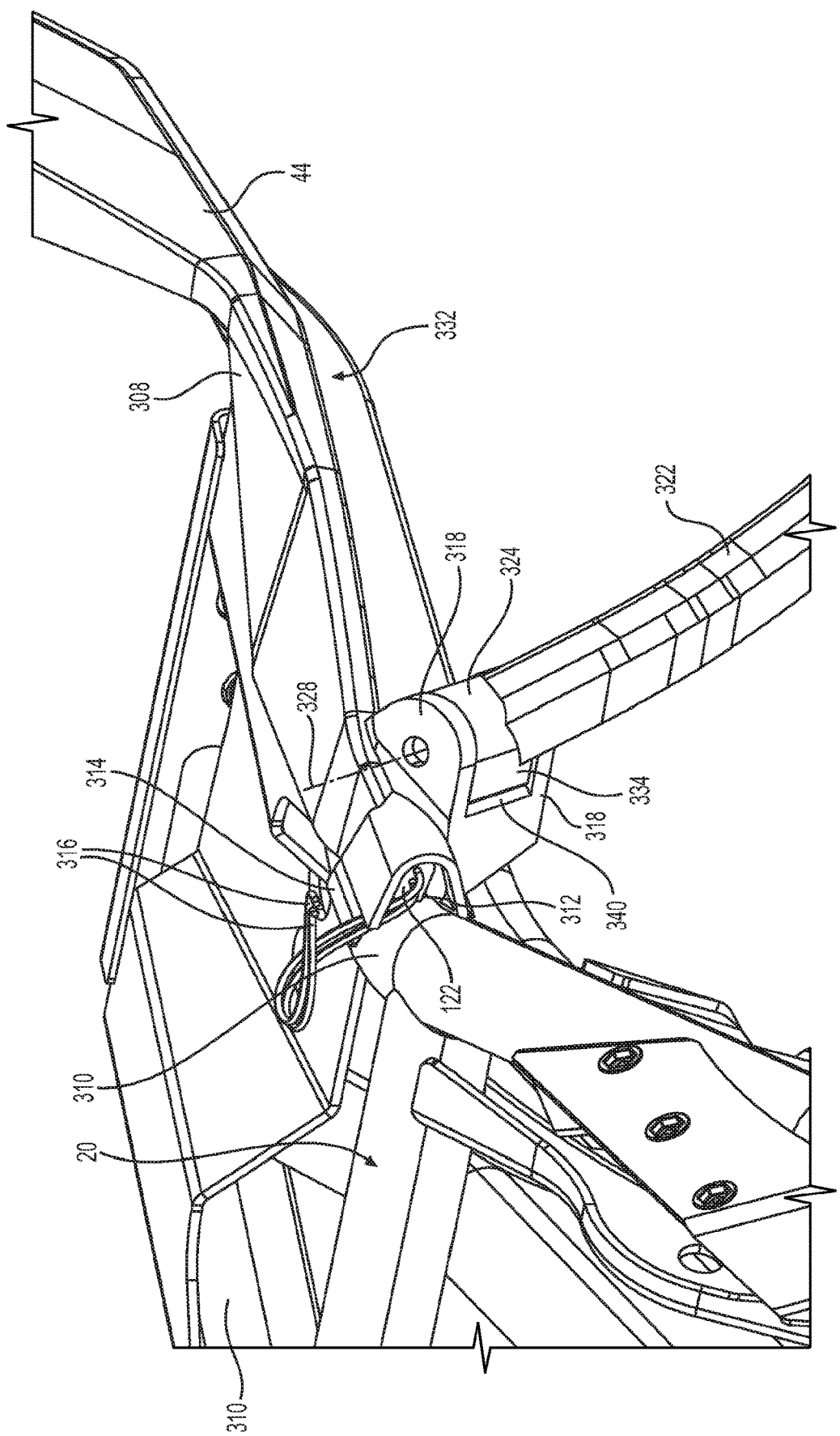
FIG. 5 is a close-up view of a connection between the left passenger footrest and the passenger support structure, of a passenger footrest position sensor and of an adjacent portion of the frame of the vehicle of FIG. 1.
Figure 6:
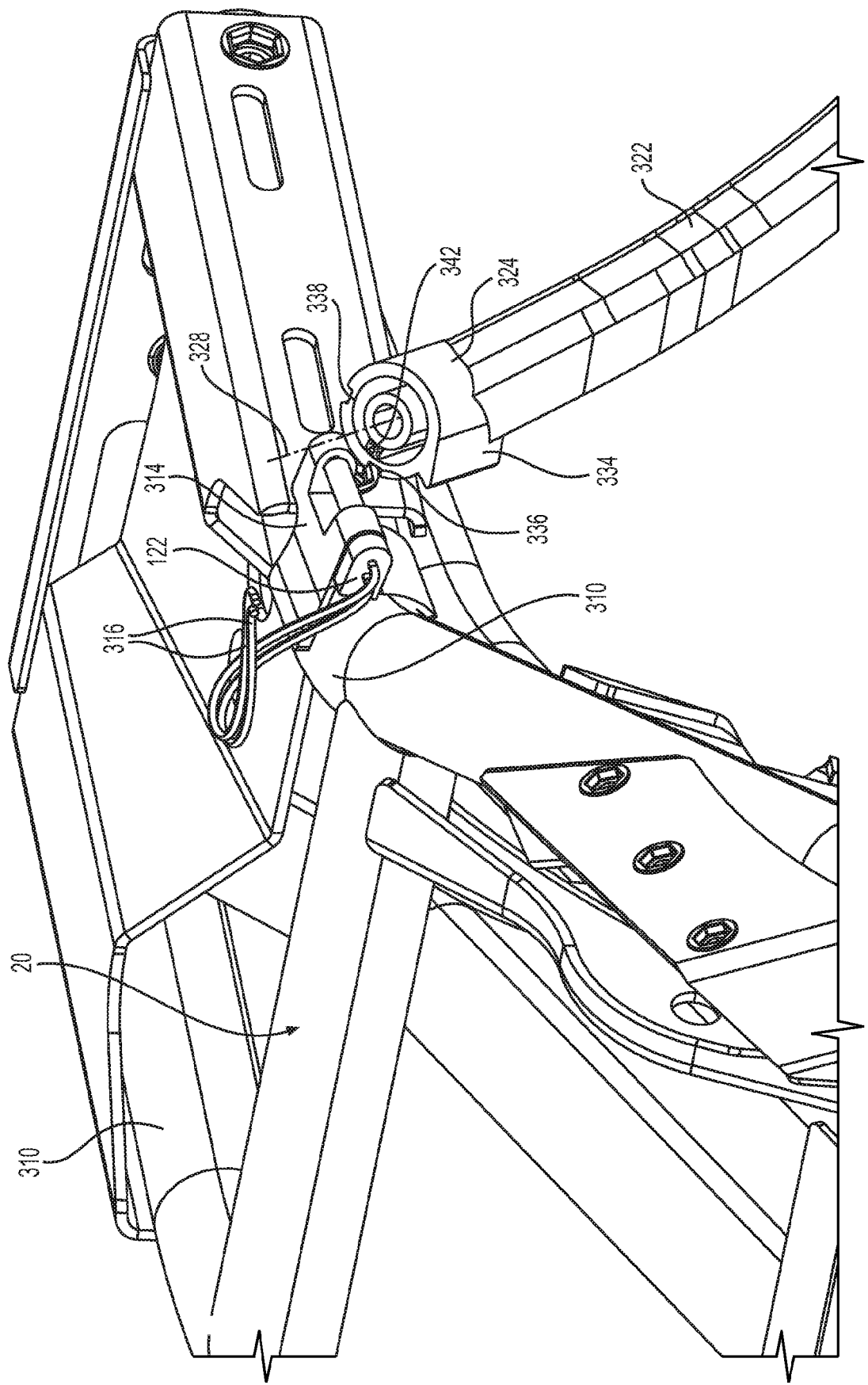
FIG. 6 is the close-up view of FIG. 5 with the passenger support structure removed.

Turning now to FIGS. 4 to 6, the driver seat portion 40, the passenger seat portion 42, the passenger support structure 44 and the passenger footrests 48 will be described in more detail. As the right passenger footrest 48 and its associated features and elements are a mirror image of the left passenger footrest 48 and its associated features and elements, for simplicity, only the left passenger footrest 48 and its associated features and elements will be described below. Corresponding features of the right passenger footrest 48 and of its associated features and elements have been numbered in the figures with the same reference numerals as those of the left passenger footrest 48 and its associated features and elements.

With reference to FIG. 4, the driver seat portion 40 has a rigid base 300 over which is disposed a cushioning layer 301 made of a material such as an integral skin foam for example. In an alternative embodiment, the driver seat portion 40 has the rigid base 300, a cushioning layer made of a material such as closed-cell form for example that is disposed over the rigid base 300, and a covering layer made of a material such as leather or vinyl for example that covers the cushioning layer. The driver seat portion 40 defines a raised, generally U-shaped, rear portion 303 against which the lower back of a driver sitting on the driver seat portion 40 rests.

The passenger seat portion 42 has a rigid base 304 over which is disposed a cushioning layer 306 made of a material such as an integral skin foam for example. In an alternative embodiment, the passenger seat portion 42 has the rigid base 304, a cushioning layer made of a material such as closed-cell form for example that is disposed over the rigid base 304, and a covering layer made of a material such as leather or vinyl for example that covers the cushioning layer. The hand grips 45 are connected to the rigid base 304. It is contemplated that the hand grips 45 could alternatively be connected to the passenger support structure 44.

The passenger seat portion 42 rests on the passenger support structure 44. The passenger support structure 44 has a rear, generally horizontal section (not shown, located under the rigid base 304) located behind the driver seat portion 40 from which extend left and right arms 308. The rigid base 304 of the passenger seat portion 42 is connected to the horizontal section of the passenger support structure between the arms 308. The arms 308 extend forward from the passenger seat portion 42 and are fastened to longitudinally extending frame members 310 (FIG. 5) of the frame 20 located under the driver seat portion 40.

As best seen in FIG. 5, the forward portion of the left arm 308 defines a space 312. The passenger footrest position sensor 122 is received in this space 312 between the forward portion of the left arm 308 and the left frame member 310. As best seen in FIG. 6, the passenger footrest position sensor 122 is connected to the left frame member 310 by a bracket 314. It is contemplated that a passenger footrest position sensor 122 could be housed in a space defined by the right arm 308 similar to the space 312 instead of or in addition to the passenger footrest position sensor 122 housed in the space 312 defined by the left arm 308. As previously described, in the present implementation the passenger footrest position sensor 122 is a Hall effect sensor, but other types of sensors are contemplated. The Hall effect sensor is connected to the ESS 140 by wires 316. Each arm 308 defines a pair of laterally outwardly extending tabs 318.

The left passenger footrest 48 has an upper textured surface 320 to help the passenger's grip onto the left passenger footrest 48. The left passenger footrest 48 is connected to the lower end of a left leg 322. In the present implementation, the left passenger footrest 48 is integrally formed with the left leg 322. It is contemplated that the left passenger footrest 48 could be connected to the left leg 322 by other means, such as a bracket for example. The upper end of the leg defines a pivot portion 324. The pivot portion 324 is received between the two tabs 318 of the left arm 308 of the passenger support structure 44. A fastener 326 (FIG. 4) is inserted through the upper tab 318 and the pivot portion 324 such that the left leg 322 and passenger footrest 48 can pivot together about a left pivot axis 328 (FIG. 4). The left pivot axis 328 extends upward and leftward as it extends forward. The leg 322 and the passenger footrest 48 pivot together about the pivot axis 328 between the deployed position 330A, shown in solid lines in FIG. 4, and the stowed position 330B, shown in dotted lines in FIG. 4. When in the deployed position 330A, the left leg 322 extends downward, leftward and rearward from the pivot portion 324 and the left passenger footrest 48 extends leftward and slightly upward from the lower end of the left leg 322. When in the stowed position 330B, the left leg 322 and the left passenger footrest 48 are received in a generally L-shaped recess 332 formed along a bottom of the left arm 308 of the passenger support structure 44. In the stowed position 330B, the left leg 322 extends generally rearward from the pivot portion 324 and the left passenger footrest 48 extends generally rearward and upward. It is contemplated that the left leg 322 and the left passenger footrest 48 could move differently between the deployed and stowed positions 330A, 330B. It is also contemplated that the left leg 322 and the left passenger footrest 48 could be oriented differently than illustrated in the figures in the deployed and stowed positions 330A, 330B. It is also contemplated that the left leg 322 could be fixed and that only the left passenger footrest 48 could move between deployed and stowed positions, in which case the passenger footrest position sensor 122 would be located at or near the lower end of the left leg 322. It is contemplated that the left leg 322 could be omitted and the left passenger footrest 48 could be movably connected to the frame 20 below the passenger seat portion 42 so as to be movable between deployed and stowed positions, in which case the passenger footrest position sensor 122 would be located near the left passenger footrest 48.

As can be seen in FIG. 6, the pivot portion 324 has a radially extending tab 334 and defines axially extending channels 336 and 338. As can be seen in FIG. 5, the tab 334 acts as a stopper that abuts the portion 340 of the left arm 308 between the tabs 318 when the left leg 322 and the left passenger footrest 48 are moved to the deployed position 330A thereby preventing pivoting of the left leg 322 and the left passenger footrest 48 about the pivot axis 328 past the deployed positions 330A. When the left leg 322 and the left passenger footrest 48 are in the deployed position 330A, the channel 336 engages a retention mechanism (not shown) connected to the left arm 308. As such, a certain amount of force is required to move the left leg 322 and the left passenger footrest 48 out of the deployed position 330A. Similarly, when the left leg 322 and the left passenger footrest 48 are in the stowed position 330B, the channel 338 engages the retention mechanism. As such, a certain amount of force is required to move the left leg 322 and the left passenger footrest 48 out of the stowed position 330B. The retention mechanism also holds the left leg 322 and the left passenger footrest 48 in the stowed position 330B. It is contemplated that a latch, a clip or another element could be provided to secure left leg 322 and the left passenger footrest 48 in the stowed position 330B. In one implementation, the retention mechanism is a pair of spring loaded ball bearing assemblies such as those described below with respect to FIGS. 7 and 8. Other retention mechanisms are contemplated such as, but not limited to, springs, Belleville washers and deformable features of the pivot portion 324 and/or the left arm 308.

As shown in FIG. 6, a magnet 342 is disposed inside the pivot portion 324. When the left leg 322 and the left passenger footrest 48 are in the deployed position 330A, the magnet 342 is nearest to the Hall effect sensor provided as the passenger footrest position sensor 122 as shown in FIG. 6. The magnetic field of the magnet 342 interacts with the Hall effect sensor, which sends a first signal in the form of a first voltage to the ESS 140 via the wires 316 indicative that the left passenger footrest 48 is in the deployed position 330A. When the left leg 322 and the left passenger footrest 48 are in the stowed position 330B, the magnet 342 is farther from the Hall effect sensor. The magnetic field of the magnet 342 interacts with the Hall effect sensor, which sends a second signal in the form of a second voltage to the ESS 140 via the wires 316 indicative that the left passenger footrest 48 is not in the deployed position 330A. The first and second voltages are different from each other.

Figure 7:
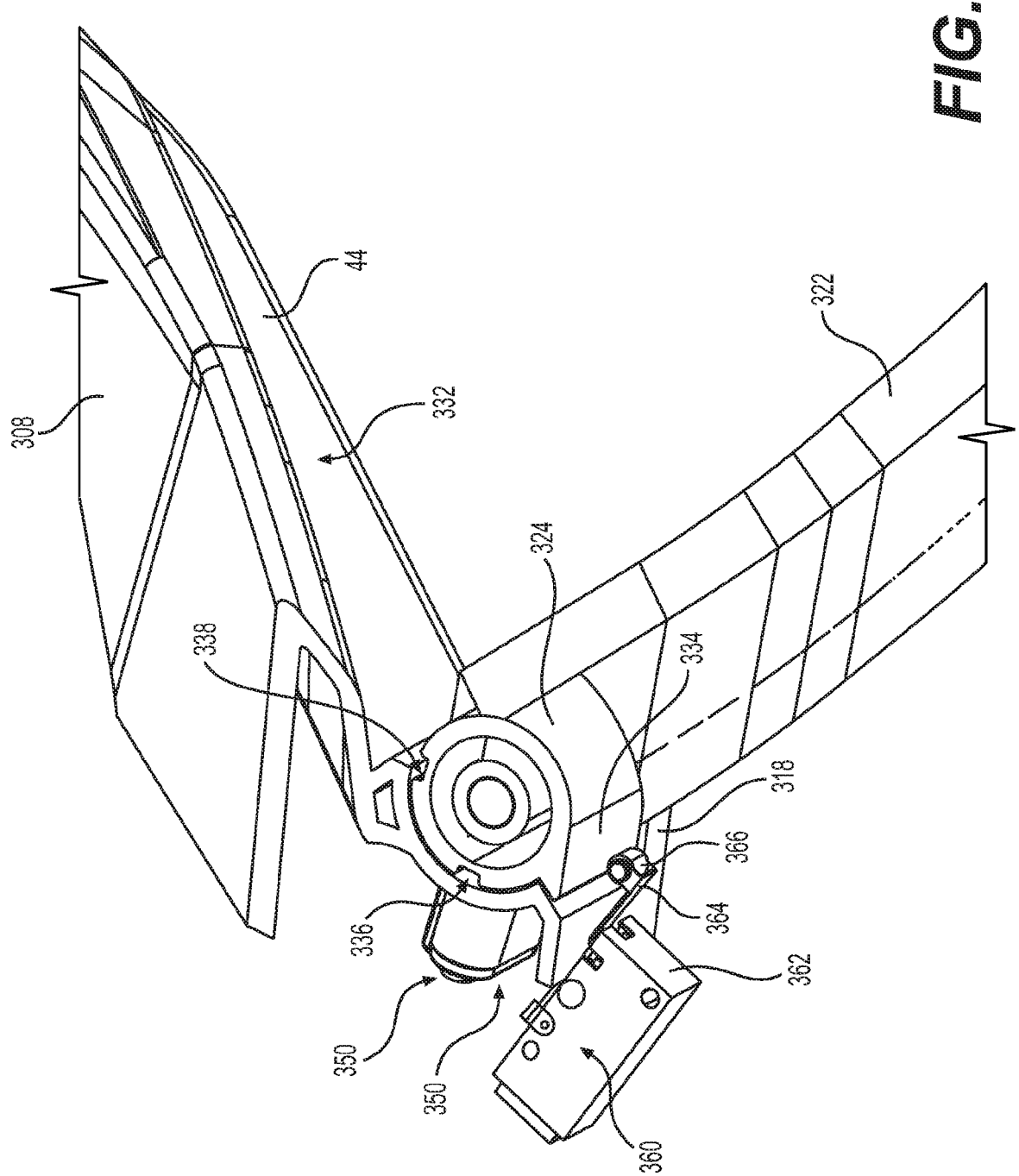
FIG. 7 is a close-up of a partial cross-section of a connection between the left passenger footrest and the passenger support structure of the vehicle of FIG. 1 with an alternative implementation of a passenger footrest position sensor.

Turning now to FIGS. 7 and 8, an implementation of a retention mechanism and an alternative implementation of the passenger footrest position sensor 122 will be described.

As can be seen in FIG. 8, the front portion of the arm 308 houses a pair of spring-loaded ball bearing assemblies 350. Each spring-loaded ball bearing assembly 350 includes a spring 352 that biases a ball bearing 354 through an aperture 356 in the arm 308 between the tabs 318. When the pivot portion 324 of the leg 322 is oriented such that the channel 336 or 338 is aligned with the apertures 356, the ball bearings are partially received in the channel 336 or 338, thereby retaining the leg 322 (and passenger footrest 48) in position.

In the implementation shown in FIGS. 7 and 8, the passenger footrest position sensor 122 has been replaced by a passenger footrest position sensor 360. The passenger footrest position sensor 360 is mounted to the left arm 308. The passenger footrest position sensor 360 is a limit switch 360 connected to the ESS 140. The limit switch 360 has a connector housing 362 to which is pivotally mounted an arm 364. The position of the arm 364 opens or closes connectors (not shown) in the connector housing 362. The arm 364 is biased away from the connector housing 362 such that the connectors are normally opened. It is contemplated that the arm 364 could be biased away from the connector housing 362 such that the connectors are normally closed. A roller 366 is provided at the end of the arm 364. When the leg 322 and the footrest 48 are in the stowed position or in intermediate positions, the roller 366 does not make contact with the pivot portion 324. As such, the arm 364 remains biased away from the connector housing 362 and the connectors of the switch 360 remain open. When the leg 322 and the footrest 48 are in the deployed position, the roller 366 makes contact with the tab 334 of the pivot portion 324. As such, the arm 364 is pushed toward the connector housing 362 and the connectors of the switch 360 are closed. The state of the switch 360 (i.e. connectors opened or closed) signals to the ESS 140 if the leg 322 and the passenger footrest 48 are in the deployed position or not.

Other types of passenger footrest position sensors are contemplated. For example, the channels 336 and 338 could differ such that the position of the ball bearings 354 when they engage the channel 336 could be different from the position of the ball bearings 354 when they engage the channel 338. As such, a sensor sensing the position of one or both ball bearings 354 could act a passenger footrest position sensor.

Some non-limiting implementations of the present technology can be represented as presented in the following numbered clauses:

CLAUSE 1. A vehicle comprising: a frame; at least two wheels attached to the frame; a motor operatively connected to at least one of the wheels; a straddle seat supported by the frame, the straddle seat defining a driver seat portion and a passenger seat portion at least partially rearward of the driver seat portion; left and right passenger footrests connected to the frame, the left and right passenger footrests each being movable between a stowed position and a deployed position; a passenger footrest position sensor for sensing a position of at least one of the left and right passenger footrests; and an electronic stability system electronically connected to the passenger footrest position sensor for receiving a signal from the passenger footrest position sensor indicative of the position of the at least one of the left and right passenger footrests, an output of the electronic stability system being defined at least in part on the signal from the passenger footrest position sensor.

CLAUSE 2. The vehicle of clause 1, wherein: the output of the electronic stability system is based at least in part on a calibration; the calibration being a first calibration when the signal from the passenger footrest position sensor is indicative of the position of the at least one of the left and right passenger footrests being the stowed position; and the calibration being a second calibration when the signal from the passenger footrest position sensor is indicative of the position of the at least one of the left and right passenger footrests being the deployed position.

CLAUSE 3. The vehicle of clause 1 or 2, wherein the motor is controlled at least in part based on the output of the electronic stability system.

CLAUSE 4. The vehicle of any one of clauses 1 to 3, further comprising a braking system including at least one brake assembly operatively connected to at least one of the at least two wheels; and wherein the braking system is controlled at least in part based on the output of the electronic stability system.

CLAUSE 5. The vehicle of any one of clauses 1 to 4, further comprising at least one vehicle operating condition sensor for sensing at least one vehicle operating condition, the electronic stability system being electronically connected to the at least one vehicle operating condition sensor for receiving a signal from the at least one vehicle operating condition sensor indicative of the at least one sensed vehicle operating condition, the output of the electronic stability system being defined at least in part on the signal from the at least one vehicle operating condition sensor.

CLAUSE 6. The vehicle of clause 5, wherein the at least one vehicle operating condition sensor is at least one of: a wheel speed sensor for sensing a speed of one of the at least two wheels; a steering angle sensor for sensing an angular position of a steering assembly, the steering assembly being operatively connected to at least one of the at least two wheels; a lateral accelerometer for sensing a lateral acceleration of the vehicle; a longitudinal accelerometer for sensing a longitudinal acceleration of the vehicle; a yaw rate sensor for sensing a yaw rate of the vehicle; and a roll sensor for sensing a roll of the vehicle.

CLAUSE 7. The vehicle of any one of clauses 1 to 6, wherein: the at least two wheels is two front wheels and one rear wheel; and the motor is operatively connected to the rear wheel.

CLAUSE 8. The vehicle of any one of clauses 1 to 7, further comprising a passenger support structure connected to the frame; wherein the passenger seat portion is supported by the passenger support structure; and wherein the left and right passenger footrests are connected to the passenger support structure.

CLAUSE 9. The vehicle of clause 8, wherein the passenger footrest position sensor is received at least partially in the passenger support structure.

CLAUSE 10. The vehicle of clause 8 or 9, wherein: the left passenger footrest extends from a left leg, the left leg moving with the left passenger footrest between the stowed position and the deployed position, the left leg extending at least partially along the passenger support structure when the left passenger footrest is in the stowed position; and the right passenger footrest extends from a right leg, the right leg moving with the right passenger footrest between the stowed position and the deployed position, the right leg extending at least partially along the passenger support structure when the right passenger footrest is in the stowed position.

CLAUSE 11. The vehicle of any one of clauses 1 to 10, further comprising left and right driver footrests connected to the frame forward of the left and right passenger footrests.

CLAUSE 12. The vehicle of any one of clauses 1 to 11, wherein the left and right passenger footrests are each pivotable between the stowed position and the deployed position.

CLAUSE 13. The vehicle of clause 12, wherein: the left footrest pivots about a left pivot axis between the stowed position and the deployed position, the left pivot axis extending upward and leftward as the left pivot axis extends forward; and the right footrest pivots about a right pivot axis between the stowed position and the deployed position, the right pivot axis extending upward and rightward as the right pivot axis extends forward.

CLAUSE 14. An electronic stability system assembly for a vehicle comprising: a passenger footrest adapted for connecting to a frame and for being movable between a stowed position and a deployed position; a passenger footrest position sensor for sensing a position of the passenger footrest; and an electronic stability system electronically connected to the passenger footrest position sensor for receiving a signal from the passenger footrest position sensor indicative of the position of the passenger footrest, an output of the electronic stability system being defined at least in part on the signal from the passenger footrest position sensor.

CLAUSE 15. The electronic stability system assembly of clause 14, wherein: the output of the electronic stability system is based at least in part on a calibration; the calibration being a first calibration when the signal from the passenger footrest position sensor is indicative of the position of the passenger footrest being the stowed position; and the calibration being a second calibration when the signal from the passenger footrest position sensor is indicative of the position of the passenger footrest being the deployed position.

CLAUSE 16. The electronic stability system assembly of clause 14 or 15, wherein the output of the electronic stability system is adapted for controlling at least in part a motor of the vehicle.

CLAUSE 17. The electronic stability system assembly of any one of clauses 14 to 16, wherein the output of the electronic stability system is adapted for controlling at least in part a braking system of the vehicle.

CLAUSE 18. The electronic stability system assembly of any one of clauses 14 to 17, further comprising at least one vehicle operating condition sensor for sensing at least one vehicle operating condition, the electronic stability system being electronically connected to the at least one vehicle operating condition sensor for receiving a signal from the at least one vehicle operating condition sensor indicative of the at least one sensed vehicle operating condition, the output of the electronic stability system being defined at least in part on the signal from the at least one vehicle operating condition sensor.

CLAUSE 19. The electronic stability system assembly of clause 18, wherein the at least one vehicle operating condition sensor is at least one of: a wheel speed sensor for sensing a speed of a wheel of the vehicle; a steering angle sensor for sensing an angular position of a steering assembly of the vehicle; a lateral accelerometer for sensing a lateral acceleration of the vehicle; a longitudinal accelerometer for sensing a longitudinal acceleration of the vehicle; a yaw rate sensor for sensing a yaw rate of the vehicle; and a roll sensor for sensing a roll of the vehicle.

CLAUSE 20. The electronic stability system assembly of any one of clauses 14 to 19, further comprising a passenger support structure adapted for connecting to the frame of the vehicle; wherein the passenger footrest is connected to the passenger support structure.

CLAUSE 21. The electronic stability system assembly of clause 20, wherein the passenger footrest position sensor is received at least partially in the passenger support structure.

CLAUSE 22. The electronic stability system assembly of clause 20 or 21, wherein the passenger footrest extends from a leg, the leg moving with the passenger footrest between the stowed position and the deployed position, the leg extending at least partially along the passenger support structure when the passenger footrest is in the stowed position.

CLAUSE 23. The electronic stability system assembly of any one of clauses 14 to 22, wherein the passenger footrest is adapted for pivoting between the stowed position and the deployed position.

CLAUSE 24. A method for controlling a vehicle, the vehicle comprising: a frame; at least two wheels attached to the frame; a straddle seat supported by the frame, the straddle seat defining a driver seat portion and a passenger seat portion adjacent to the driver seat portion; and left and right passenger footrests connected to the frame, the left and right passenger footrests each being movable between a stowed position and a deployed position; the method comprising: sensing a position of at least one of the left and right passenger footrests; defining an output of an electronic stability system of the vehicle based at least in part on the sensed position of the at least one of the left and right passenger footrests; and controlling a stability of the vehicle using the output of the electronic stability system.

CLAUSE 25. The method of clause 24, further comprising: selecting a first calibration of the electronic stability system when the sensed position of the at least one of the left and right passenger footrests is the stowed position; and selecting a second calibration of the electronic stability system when the sensed position of the at least one of the left and right passenger footrests is the deployed position; wherein the output of the electronic stability system is defined based at least in part on a selected one of the first and second calibration positions.

CLAUSE 26. The method of clause 24 or 25, wherein controlling the stability of the vehicle using the output of the electronic stability system comprises controlling an operation of a motor of the vehicle.

CLAUSE 27. The method of any one of clauses 24 to 26, wherein controlling the stability of the vehicle using the output of the electronic stability system comprises controlling an operation of a braking system of the vehicle.

CLAUSE 28. The method of any one of clauses 24 to 27, further comprising sensing at least one vehicle operating condition, the at least one vehicle operating condition is at least one of a wheel speed, a steering angle, a lateral acceleration, a longitudinal acceleration, a yaw rate, and a roll; and wherein the output of the electronic stability system of the vehicle is defined based at least in part on the at least one sensed vehicle operating condition.

It should be appreciated by those skilled in the art that modifications and variations can be made to the implementations of the technology set forth herein without departing from the scope and spirit of the technology as set forth in the appended claims and their equivalents.

What is claimed is:
1. A vehicle comprising:
   a frame;
   at least two wheels attached to the frame;
   a motor operatively connected to at least one of the wheels;
   a straddle seat supported by the frame, the straddle seat defining a driver seat portion and a passenger seat portion at least partially rearward of the driver seat portion;

left and right passenger footrests connected to the frame, the left and right passenger footrests each being movable between a stowed position and a deployed position;

a passenger footrest position sensor for sensing a position of at least one of the left and right passenger footrests; and an electronic stability system electronically connected to the passenger footrest position sensor for receiving a signal from the passenger footrest position sensor indicative of the position of the at least one of the left and right passenger footrests, an output of the electronic stability system being defined at least in part on the signal from the passenger footrest position sensor.

2. The vehicle of claim 1, wherein:

the output of the electronic stability system is based at least in part on a calibration;

the calibration being a first calibration when the signal from the passenger footrest position sensor is indicative of the position of the at least one of the left and right passenger footrests being the stowed position; and the calibration being a second calibration when the signal from the passenger footrest position sensor is indicative of the position of the at least one of the left and right passenger footrests being the deployed position.

3. The vehicle of claim 1, wherein the motor is controlled at least in part based on the output of the electronic stability system.

4. The vehicle of claim 1, further comprising a braking system including at least one brake assembly operatively connected to at least one of the at least two wheels; and wherein the braking system is controlled at least in part based on the output of the electronic stability system.

5. The vehicle of claim 1, further comprising at least one vehicle operating condition sensor for sensing at least one vehicle operating condition, the electronic stability system being electronically connected to the at least one vehicle operating condition sensor for receiving a signal from the at least one vehicle operating condition sensor indicative of the at least one sensed vehicle operating condition, the output of the electronic stability system being defined at least in part on the signal from the at least one vehicle operating condition sensor.

6. The vehicle of claim 5, wherein the at least one vehicle operating condition sensor is at least one of:

a wheel speed sensor for sensing a speed of one of the at least two wheels;

a steering angle sensor for sensing an angular position of a steering assembly, the steering assembly being operatively connected to at least one of the at least two wheels;

a lateral accelerometer for sensing a lateral acceleration of the vehicle;

a longitudinal accelerometer for sensing a longitudinal acceleration of the vehicle;

a yaw rate sensor for sensing a yaw rate of the vehicle; and a roll sensor for sensing a roll of the vehicle.

7. The vehicle of claim 1, wherein the left and right passenger footrests are each pivotable between the stowed position and the deployed position.

8. An electronic stability system assembly for a vehicle comprising:

a passenger footrest adapted for connecting to a frame and for being movable between a stowed position and a deployed position;

a passenger footrest position sensor for sensing a position of the passenger footrest; and an electronic stability system electronically connected to the passenger footrest position sensor for receiving a signal from the passenger footrest position sensor indicative of the position of the passenger footrest, an output of the electronic stability system being defined at least in part on the signal from the passenger footrest position sensor.

9. The electronic stability system assembly of claim 8, wherein:

the output of the electronic stability system is based at least in part on a calibration;

the calibration being a first calibration when the signal from the passenger footrest position sensor is indicative of the position of the passenger footrest being the stowed position; and the calibration being a second calibration when the signal from the passenger footrest position sensor is indicative of the position of the passenger footrest being the deployed position.

10. The electronic stability system assembly of claim 8, wherein the output of the electronic stability system is adapted for controlling at least in part a motor of the vehicle.

11. The electronic stability system assembly of claim 8, wherein the output of the electronic stability system is adapted for controlling at least in part a braking system of the vehicle.

12. The electronic stability system assembly of claim 8, further comprising at least one vehicle operating condition sensor for sensing at least one vehicle operating condition, the electronic stability system being electronically connected to the at least one vehicle operating condition sensor for receiving a signal from the at least one vehicle operating condition sensor indicative of the at least one sensed vehicle operating condition, the output of the electronic stability system being defined at least in part on the signal from the at least one vehicle operating condition sensor.

13. The electronic stability system assembly of claim 12, wherein the at least one vehicle operating condition sensor is at least one of:

a wheel speed sensor for sensing a speed of a wheel of the vehicle;

a steering angle sensor for sensing an angular position of a steering assembly of the vehicle;

a lateral accelerometer for sensing a lateral acceleration of the vehicle;

a longitudinal accelerometer for sensing a longitudinal acceleration of the vehicle;

a yaw rate sensor for sensing a yaw rate of the vehicle; and a roll sensor for sensing a roll of the vehicle.

14. The electronic stability system assembly of claim 8, further comprising a passenger support structure adapted for connecting to the frame of the vehicle;

wherein the passenger footrest is connected to the passenger support structure.

15. The electronic stability system assembly of claim 14, wherein the passenger footrest position sensor is received at least partially in the passenger support structure.

16. The electronic stability system assembly of claim 8, wherein the passenger footrest is adapted for pivoting between the stowed position and the deployed position.

17. A method for controlling a vehicle, the vehicle comprising:
- a frame;
- at least two wheels attached to the frame;
- a straddle seat supported by the frame, the straddle seat defining a driver seat portion and a passenger seat portion adjacent to the driver seat portion; and
- left and right passenger footrests connected to the frame, the left and right passenger footrests each being movable between a stowed position and a deployed position;

the method comprising:
- sensing a position of at least one of the left and right passenger footrests;
- defining an output of an electronic stability system of the vehicle based at least in part on the sensed position of the at least one of the left and right passenger footrests; and
- controlling a stability of the vehicle using the output of the electronic stability system.

18. The method of claim 17, further comprising:
- selecting a first calibration of the electronic stability system when the sensed position of the at least one of the left and right passenger footrests is the stowed position; and
- selecting a second calibration of the electronic stability system when the sensed position of the at least one of the left and right passenger footrests is the deployed position;
- wherein the output of the electronic stability system is defined based at least in part on a selected one of the first and second calibration positions.

19. The method of claim 17, wherein controlling the stability of the vehicle using the output of the electronic stability system comprises controlling an operation of a motor of the vehicle.

20. The method of claim 17, wherein controlling the stability of the vehicle using the output of the electronic stability system comprises controlling an operation of a braking system of the vehicle.

* * * * *